(12) United States Patent
McMahon et al.

(10) Patent No.: US 12,112,319 B1
(45) Date of Patent: *Oct. 8, 2024

(54) SYSTEMS AND METHODS FOR DATA COMMUNICATION USING A STATELESS APPLICATION

(71) Applicant: CITIBANK, N.A., New York, NY (US)

(72) Inventors: Alex McMahon, Dublin (IE); Paul Carey, Dublin (IE); Archana Loganathan, Dublin (IE); Wayne Crombie, London (GB)

(73) Assignee: Citibank, N.A., New York, NY (US)

( * ) Notice: Subject to any disclaimer, the term of this patent is extended or adjusted under 35 U.S.C. 154(b) by 136 days.

This patent is subject to a terminal disclaimer.

(21) Appl. No.: 17/967,284

(22) Filed: Oct. 17, 2022

Related U.S. Application Data

(63) Continuation of application No. 15/641,500, filed on Jul. 5, 2017, now Pat. No. 11,507,947.

(51) Int. Cl.
| | |
|---|---|
| *G06Q 20/38* | (2012.01) |
| *G06F 21/62* | (2013.01) |
| *G06Q 20/10* | (2012.01) |
| *G06Q 40/04* | (2012.01) |

(52) U.S. Cl.
CPC ....... *G06Q 20/382* (2013.01); *G06F 21/6245* (2013.01); *G06Q 20/10* (2013.01); *G06Q 20/381* (2013.01); *G06Q 40/04* (2013.01)

(58) Field of Classification Search
None
See application file for complete search history.

(56) References Cited

U.S. PATENT DOCUMENTS

| | | | |
|---|---|---|---|
| 8,255,304 B1 | 8/2012 | Lorenzo | |
| 8,768,838 B1 | 7/2014 | Hoffman | |
| 10,437,564 B1 * | 10/2019 | Periwal | G06F 8/315 |
| 2001/0025265 A1 | 9/2001 | Takayasu | |
| 2002/0002675 A1 * | 1/2002 | Bush | G06Q 20/102 713/160 |
| 2003/0220860 A1 | 11/2003 | Heytens et al. | |
| 2004/0064414 A1 | 4/2004 | Silverbrook et al. | |

(Continued)

FOREIGN PATENT DOCUMENTS

ES  2703055 T3 *  3/2019  ............ H04W 16/32

OTHER PUBLICATIONS

U.S. Appl. No. 62/525,600 (Distributed Ledger Gateway), Moy et al., filed Jun. 27, 2017) (Year: 2017).*

(Continued)

*Primary Examiner* — Paul S Schwarzenberg
(74) *Attorney, Agent, or Firm* — Perkins Coie LLP

(57) ABSTRACT

Systems and methods for communication of electronic data in which one or more memory-coupled entity processors programmed to execute a stateless application that persists no data except configuration data in the stateless application and causes the at least one entity processor to receive data in a first format from a data source to which the stateless application executing on the at least one entity processor is loosely coupled; translate the received data to a second format for a data destination; and submit the data in the second format to the data destination to which the stateless application executing on the at least one entity processor is also loosely coupled.

20 Claims, 5 Drawing Sheets

(56) References Cited

U.S. PATENT DOCUMENTS

| | | | |
|---|---|---|---|
| 2005/0222931 A1 | 10/2005 | Mamou et al. | |
| 2008/0024163 A1 | 1/2008 | Marui | |
| 2008/0052137 A1 | 2/2008 | Ziade et al. | |
| 2009/0222106 A1* | 9/2009 | Braun | G05B 19/0426 700/3 |
| 2012/0143903 A1 | 6/2012 | Scully et al. | |
| 2014/0281909 A1* | 9/2014 | Pinto | G06F 9/45529 707/810 |
| 2015/0363374 A1 | 12/2015 | Lees | |
| 2017/0006135 A1* | 1/2017 | Siebel | H04L 67/566 |
| 2018/0351744 A1 | 12/2018 | Ogle et al. | |
| 2019/0130391 A1 | 5/2019 | Wright et al. | |

OTHER PUBLICATIONS

FIG.1 from Moy Above (2017): Jun. 27, 2017 (Year: 2017).*

Final Office Action for U.S. Appl. No. 15/641,500, filed Oct. 16, 2019, 46 pages.

Final Office Action for U.S. Appl. No. 15/641,500, filed Dec. 22, 2021, 22.

Office Action for U.S. Appl. No. 15/641,500, filed Apr. 1, 2022, 25 pages.

Office Action for U.S. Appl. No. 15/641,500, filed Jun. 28, 2019, 46 pages.

Final Office Action for U.S. Appl. No. 15/641,500, filed Sep. 24, 2020, 22 pages.

Office Action for U.S. Appl. No. 15/641,500, filed Sep. 9, 2021, 20 pages.

"Information Resources Management Association, Grid and Cloud Computing: Concepts, Methodologies, Tools and Applications", available online digitally at (click "Search inside"): https://www.google.com/books/editions/_/ulKr4CXuQW4C (Non-Patent Literature or NPL) ("Grid") (Cited pages printed out), 2012, 2012, 6 pages.

Moy, et al., U.S. Appl. No. 62/525,600 ("Distributed Ledger Gateway") filed Jun. 27, 2017, Jun. 12, 2020, 11 pages.

* cited by examiner

SYSTEMS AND METHODS FOR DATA COMMUNICATION USING A STATELESS APPLICATION

CROSS REFERENCE TO RELATED APPLICATIONS

This application is continuation of U.S. patent application Ser. No. 15/641,500, filed Jul. 5, 2017. The content of the foregoing application is incorporated herein in its entirety by reference.

FIELD OF THE INVENTION

The present invention relates generally to the field of electronic data communication, and more particularly to systems and methods for orchestration of electronic data communication using a stateless application.

BACKGROUND

Current funds transfer systems present many challenges to participating entities, such as banks. For example, it is difficult to track and audit funds transfers as they pass through multiple correspondent banks. There is also a risk, for example, of loss of critical information about payments as payment messages are transferred across banks and borders. Other challenges include, for example, lack of currency exchange transparency.

There is a present need for a solution that resolves all of the foregoing issues and provides, for example, improved methods and systems for communication of electronic data in a stateless environment that assure, for example, that funds may be received into an account, such as a client account, and represented in a tamper-proof way and that enable payment from that account on receipt of a tamper-proof representation of value.

SUMMARY OF THE INVENTION

Embodiments of the invention employ computer hardware and software, including, without limitation, one or more processors coupled to memory and non-transitory computer-readable storage media with one or more executable programs stored thereon which instruct the processors to perform the methods described herein. Such embodiments are directed to technological solutions that may involve systems that include, for example, at least one memory-coupled entity processor programmed to execute a stateless application that persists no data except configuration data in the stateless application and causes the at least one entity processor to receive data in a first format from a data source to which the stateless application executing on the at least one entity processor is loosely coupled; translate the received data to a second format for a data destination; and submit the data in the second format to the data destination to which the stateless application executing on the at least one entity processor is also loosely coupled.

In an aspect of the system for embodiments of the invention, the data may be received in the first format from the data source comprising, for example, an entity financial system processor. In an additional aspect, the data may be received from the entity financial system processor in the first format comprising, for example, a predetermined electronic data interchange format. In a further aspect, the predetermined electronic data interchange format may comprise, for example, a metadata repository containing descriptions of messages and business processes and a maintenance process for contents of the metadata repository. In another aspect, the predetermined electronic data interchange format may comprise, for example, a representation of cash management and status messages.

In still another aspect of the system for embodiments of the invention, the stateless application executing on the at least one entity processor may cause the at least one entity processor, for example, to store the received data within an interchange construct independent of the first and second formats. In a still further aspect, the stateless application executing on the at least one entity processor may cause the at least one entity processor, for example, to store the received data within the interchange construct based at least in part on a predefined set of parameters. In a further aspect, the predefined set of parameters may comprise mandatory, conditional, and optional fields. In additional aspects, the predefined set of parameters may further comprise, for example, mandatory fields across all countries, conditional fields for a specific country, and optional fields correlating a particular transaction to a set of systems in a transaction to which the received data relates.

In another aspect of the system for embodiments of the invention, the stateless application executing on the at least one entity processor may, for example, cause the at least one entity processor to translate the received data to the second format comprising a predefined tamper-proof sequence of data. In further aspects, for example, the stateless application executing on the at least one entity processor may cause the at least one entity processor to translate the received data to the tamper-proof sequence of data using a predefined set of generic functions. In still further aspects, for example, the predefined set of generic functions may comprise generic reading and writing operations of payment and currency exchange message sets as the tamperproof sequence of data.

In still other aspects of the system for embodiments of the invention, for example, the stateless application executing on the at least one entity processor may cause the at least one entity processor to write the data to the data destination in the second format comprising the tamper-proof sequence of data. In additional aspects, for example, the stateless application executing on the at least one entity processor may cause the at least one entity processor to write the tamper-proof sequence of data to the data destination comprising a shared ledger function of at least one client memory-coupled processor.

In further aspects of the system for embodiments of the invention, for example, the stateless application executing on the at least one entity processor may cause the at least one entity processor to receive the data from the data source comprising a shared ledger function of at least one client memory-coupled processor. In still further aspects, for example, the stateless application executing on the at least one entity processor may cause the at least one entity processor to read the data in the first format comprising a tamperproof sequence of data from the shared ledger function of the at least one client memory-coupled processor. In additional aspects, for example, the stateless application executing on the at least one entity processor may cause the at least one entity processor to read the data from the shared ledger function of the at least one client memory-coupled processor.

In other aspects of the system for embodiments of the invention, for example, the stateless application executing on the at least one entity processor may cause the at least one entity processor to parse the data received from the shared ledger function of the at least one client memory-coupled processor. In still other aspects, for example, the stateless application executing on the at least one entity processor may cause the at least one entity processor to translate the data received from the shared ledger function of the at least one client memory-coupled processor to the second format comprising a predetermined file format. In further aspects, for example, the stateless application executing on the at least one entity processor may cause the at least one entity processor to send the translated data in the predetermined file format to an entity financial system processor.

Embodiments directed to the technological solutions described herein may also involve a method that includes, for example, receiving, by at least one memory-coupled entity processor executing a stateless application that persists no data except configuration data in the stateless application, data in a first format from a data source to which the stateless application executing on the at least one entity processor is loosely coupled; translating, by the at least one memory-coupled entity processor executing the stateless application, the received data to a second format for a data destination; and submitting, by the at least one memory-coupled entity processor executing the stateless application, the data in the second format to the data destination to which the stateless application executing on the at least one entity processor is also loosely coupled.

In additional aspects of the method for embodiments of the invention, for example, receiving the data may involve receiving the data in the first format from an entity financial system processor data source. Further aspects may involve, for example, storing the received data within an interchange construct independent of the first and second formats. In still further aspects, translating the received data to the second format may involve, for example, translating the received data to a predefined tamper-proof sequence of data. In other aspects, receiving the data may involve, for example, receiving the data in the first format from a shared ledger function of at least one client memory-coupled processor. In still other aspects, translating the data may involve, for example, translating the received data to a predetermined file format. In further aspects, submitting the data in the second format to the data destination may involve, for example, sending the data in a predetermined file format to an entity financial system processor.

These and other aspects of the invention will be set forth in part in the description which follows and in part will become more apparent to those skilled in the art upon examination of the following or may be learned from practice of the invention. It is intended that all such aspects are to be included within this description, are to be within the scope of the present invention, and are to be protected by the accompanying claims.

DETAILED DESCRIPTION OF THE INVENTION

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For example, features illustrated or described as part of one embodiment can be used in another embodiment to yield a still further embodiment. Thus, it is intended that the present invention cover such modifications and variations that come within the scope of the invention.

Embodiments of the invention provide a stateless application that resolves problems of legacy payment processes by enabling funds to be received into a client's account and representing a value of those received funds, for example, on a shared ledger as a tamper-proof sequence of data, which may be referred to as a "cash-in" flow. In addition, the stateless application for embodiments of the invention enables the payment from that client account on receipt of a representation of value on the tamper-proof sequence of data on the shared ledger, which may be referred to as a "cash-out" flow.

Figure 1:
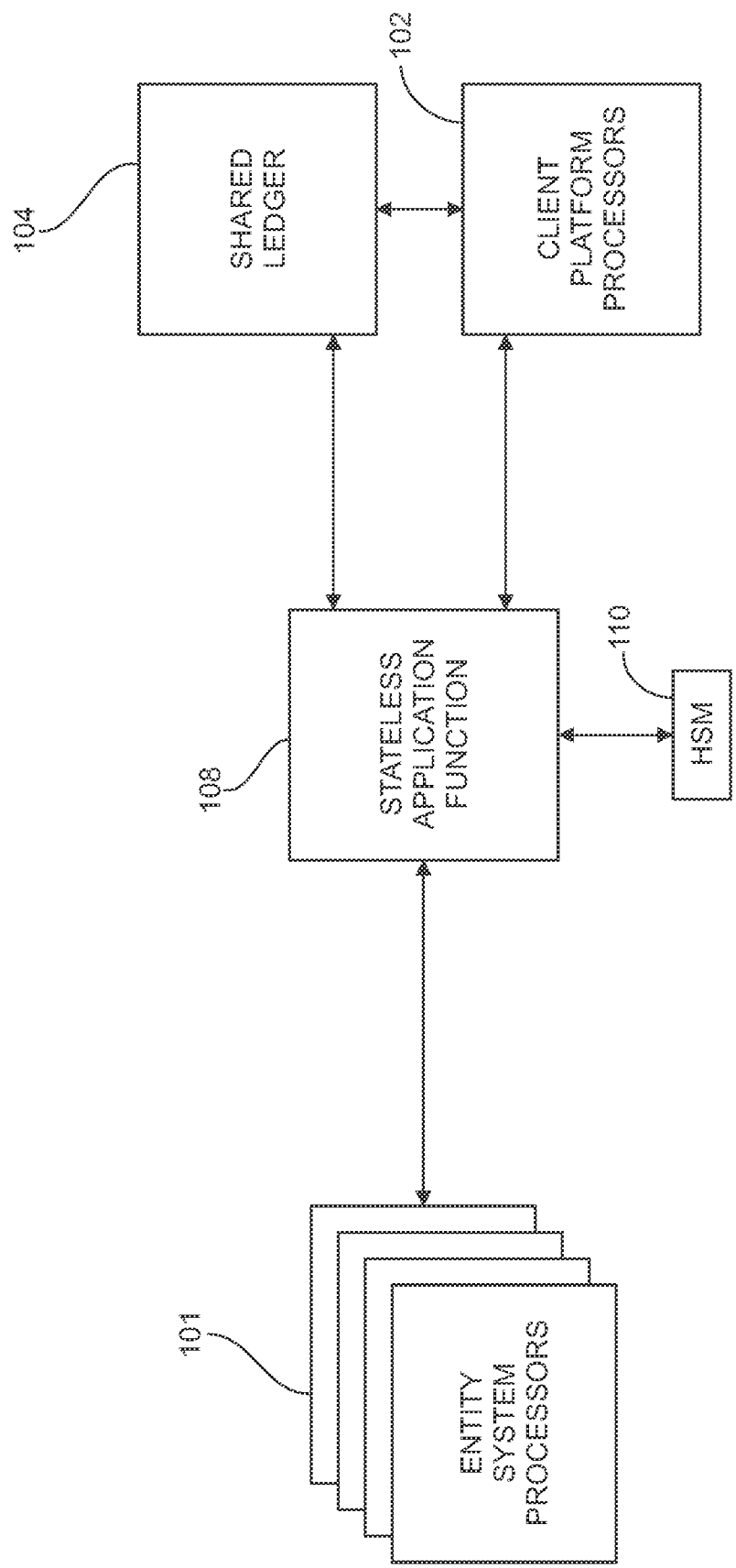
FIG. 1 is a schematic diagram that illustrates an overview example of components and flow of information between components for systems according to embodiments of the invention.

FIG. 1 is a schematic diagram that illustrates an overview example of components and flow of information between components for systems according to embodiments of the invention. Referring to FIG. 1, the stateless application 108 for embodiments of the invention may communicate on one side with one or more entity system processors 101, such as conventional enterprise banking platform processors, and on the other side with one or more shared ledger systems 104, which may be used to host a tamper-proof sequence of data. In addition, the stateless application 108 may communicate on such other side with one or more processors of a client platform 102, which may in turn communicate with the one or more shared ledger systems 104. A hardware security module (HSM) 110 may be coupled to the stateless application 108 and may be used to digitally sign data submitting a signed transaction prior to committing the transaction to the shared ledger 104.

An aspect of the stateless application 108 for embodiments of the invention may involve, for example, reading and converting or translating messages from a format employed by such enterprise banking platforms 101 on the one side into the tamper-proof sequence of data on the other side. Such shared ledger systems 104 may include, for example, one or more blockchain platforms, such as the ETHEREUM platform, or any non-blockchain shared ledger platform capable of hosting a tamper-proof sequence of data on a shared ledger.

The stateless application 108 for embodiments of the invention is loosely coupled to messaging and transport mechanisms, that enable, for example, payment initiation and receivables, foreign exchange (FX) rate request and subsequent deal booking on a rate, and coordination and eventual consistency between centralized systems, such as existing financial institution systems 101, and the shared ledger 104. In addition, the stateless application 108 for embodiments of the invention implements a finite state machine that represents a state of transactions that are external to the shared ledger 104.

The stateless application 108 for embodiments of the invention also provides a set of operations for reading and writing of payments and FX message sets as a tamperproof sequence of data on the shared ledger 104. For example, the stateless application 108 may implement a set of generic payment and FX operations that allows it to communicate with any platform, such as entity system 101 and client platform 102. The set of operations may include, for example, "create asset", "list asset on the shared ledger", "submit transaction", and "build transaction".

The application 108 for embodiments of the invention is stateless, which means that it does not persist any information or data other than configuration data in the application. Thus, no data, such as client data, that passes through the stateless application 108 for embodiments of the invention is persisted, and the stateless application discards information as it reads that information. The stateless application 108 for embodiments of the invention can read information, such as client information, from any financial institution system, such as existing legacy systems 101, but the stateless application is loosely coupled to the systems with which it communicates on the one side and also loosely coupled to the tamper-proof sequence of data on a shared ledger 104 elsewhere. Thus, the stateless application 108 for embodiments of the invention is loosely coupled at the transport of data to the messaging format and does not hold any state but provides reliable transport of messages in any transfer of such messages.

The message formats employed in embodiments of the invention may involve, for example, messages in relation to payment initiation and receiving. The stateless application 108 for embodiments of the invention enables payment initiation and receivables through ensuring, for example, reliable reading and writing of payments and FX, for example, in ISO 20022 message sets as a tamper-proof sequence of data on the shared ledger 104. ISO 20022 is an ISO (International Organization for Standardization) standard for electronic data interchange between financial institutions that describes a metadata repository containing descriptions of messages and business processes, and a maintenance process for the repository content. The stateless application 108 also enables such payment initiation and receivables by providing, for example, a mechanism to create and work with a standardized interchange format representation of ISO 20022 same currency payment messages and in cross-border payments and FX ISO 20022 message sets.

In addition, the stateless application 108 for embodiments of the invention also enables such payment initiation and receivables by providing, for example, a mechanism to create and work with a standardized interchange format representation of cash management and status using, for example, SWIFT MT942, MT940, and MT910 messages, funding notification reports that may be referred to as pre-advice, a function of which is notification of expected funding, and matched funding reports. MT942 is a SWIFT (Society for Worldwide Interbank Financial Telecommunication) interim account statement message format; MT940 is a SWIFT customer statement message format; and MT910 is a SWIFT confirmation of credit message format. Further, the stateless application 108 ensures a reliable standardized naming scheme to enable strict ordering of cross-border payments and FX in ISO 20022 message sets, cash management and SWIFT MT942, MT940, and MT910 status messages, funding pre-advice, and fund matching messages.

It is to be noted that messages that are received or created by the stateless application 108 for embodiments of the invention in a format, such as SWIFT format or ISO 20022 format, are transformed by the stateless application. Regardless of the messaging format, such as SWIFT or ISO 20022 or any other format, the information received by the stateless application 108 is stored in a data interchange format structure, such as a JAVASCRIPT OBJECT NOTATION (JSON) structure. Thus, information received by the stateless application 108 is stored within an interchange construct, which is independent of any underlying messaging format in which the information may be received and is specifically employed to enable the interchange between any of such formats. The structure itself is validated and is based on mandatory, conditional, and optional parameters.

In embodiments of the invention, such mandatory, conditional, and optional parameters are a requirement based, for example, on the country and currency involved. The mandatory field may be required for all countries, such that information is required for any country involved. The conditional field may require country-specific information that may also be provided in the metadata. The optional fields may be used to map upstream systems to downstream systems by a shared ledger transaction to a legacy or existing system transaction. Referring, for example, to main flows, "cash in" and "cash out", a "cash in" transaction in Brazil must include a set of interchange data in the shared ledger transaction. Such interchange data may include, for example a set of mandatory fields across all countries, a conditional field for Brazil, and an optional field used to correlate the particular transaction on the shared ledger to a set of systems in the existing financial information process.

The stateless application 108 for embodiments of the invention may read from and write to the shared ledger 104. The data which the stateless application 108 reads and writes may be payment and FX-related data in one or more industry standard formats, such as SWIFT and ISO 20022 formats, or any other industry standard format. As noted-note, the stateless application 108 is loosely coupled to such messaging and may be implemented, for example, to read and write ISO 20022 payment of FX messages and SWIFT and cash management messages, MT942, MT940, and MT910. The stateless application can read or write the sequence of data on the shared ledger 104 that may exist locally, remotely, or in multiple local and/or remote locations. It is to be understood that in embodiments of the invention, while the ledger may be shared, it is not necessary for the ledger to be shared.

The stateless application 108 for embodiments of the invention may also ensure reliable reading and writing of payments and FX in ISO 20022 message sets from and to centralized computer system processors, such as entity system processors 101 or client platform processors 102. Thus, the stateless application 108 may write to payment system processors, such as GLOBAL PAYMENTS PLATFORM (GPP) or FLEXCUBE PAYMENT SYSTEMS. The stateless application 108 is independent of specific computer systems and may be implemented to write in any system. In addition, the stateless application 108 ensures reliable reading, writing and transport of FX in enterprise grade messaging middleware message sets from and to centralized computer systems, and reliable writing and transport of pre-advice and matched funding report pre-advice and transmission to centralized computer systems, such as entity systems 101 and client platform 102 to facilitate near real-time matching of credits.

In reliably reading and writing messages, the stateless application 108 for embodiments of the invention may employ one or more enterprise messaging transports, such as WEBSPHERE MQ or NETWORK DATA MOVER by IBM. By employing reliable transport systems, the stateless application 108 can reliably transmit, be tolerant of disruption, and can replay messages. Since the application 108 is stateless, it has no information itself, and if the stateless application 108 fails to process information correctly, it may try again until it succeeds, using the reliable reading and writing transport. The stateless application 108 may perform this function for FX information and for pre-advice information on funding credit, and also with matching information.

The stateless application 108 for embodiments of the invention may also provide a function of fund matching and may match fundings that are received at an account to an existing payment on the shared ledger 104. Thus, the stateless application 108 may ensure reliable funding matching in which the stateless application may send a matching request to a trusted third party application, the trusted third party application may validate the matching request, and if successful, an address on the shared ledger 104 may be generated and provided along with other data as required.

The stateless application 108 for embodiments of the invention may enable FX rate request and deal booking by providing a synchronous RESTful service (Representational State Transfer or REST architecture style for designing networked applications) to facilitate near real-time FX rate requests, a synchronous RESTful service to facilitate near real-time FX deal booking or unwinding, a funding notification engine to advise of expected funding, and a reliable transport of FX in enterprise grade messaging middleware message sets from and to centralized computer systems;

In an FX rate request and deal booking aspect for embodiments of the invention, as noted, the application 108 is stateless and loosely coupled to information to enable FX rate request and subsequent deal booking. The stateless application 108 may do so by providing on one hand a set of synchronous RESTful services that enable real-time FX rate requesting and another set of interfaces that may also be RESTful and may enable real-time deal booking or unwinding of a rate request. On the other side, the stateless application 108 may communicate with existing financial systems, such as entity systems 101, using their enterprise grade messaging systems. As noted, the stateless application 108 is loosely coupled to such systems and is not dependent on a particular transport but may use any existing interface in order to request an FX rate and book a deal.

An advantage of the shared ledger 104 in embodiments of the invention is that it can be seen by all participants but not changed. Another advantage of the shared ledger 104 is that it can track the state of a transaction over a longer transaction. For example, if a rate request and subsequent deal booking is performed to fulfill another transaction, which may be time sensitive, the lifetime of that transaction may be maintained on the shared ledger 104. Thus, all of the parties involved in providing the FX rate, in acquiring the FX rate, and in the subsequent deal booking may observe the same data on the shared ledger 104 and may be aware of the timing, the rate offered, the rate given, and the transactions performed. An alternative aspect for embodiments of the invention without direct connectivity may involve the FX request and deal booking by a client occurring on the shared ledger 104 and the subsequent processing likewise occurring by reading from the shared ledger.

In addition, the stateless application 108 for embodiments of the invention enables coordination and eventual consistency between centralized systems, such as entity systems 101, and the shared ledger 104 to provide coherency between the tamperproof sequence of payments and FX in ISO 20022 message sets on the shared ledger and on the centralized computer systems, reporting on distributed transaction commits and an ability to track ownership of assets on the shared ledger and on the centralized computer systems, as well as an alerting notification capability to raise exceptions and initiate investigations.

The stateless application 108 for embodiments of the invention may enable such coordination and consistency between the centralized systems and the shared ledger 104 through a number of mechanisms. Such mechanisms may include, for example, the sequences of payment and FX information in the interchange format previously mentioned, as well as the set of fields used to correlate that information to the transaction on the shared ledger 104. Thus, as a transaction from issuance is created with that information, the information is recorded in the transaction as it is moved about, updated and changed, thereby allowing the provenance of the transaction and its state transition to be audited and replicated coherently amongst any number of instances of the shared ledger 104 and correlated to a back end centralized computer system, such as the entity system 101.

In embodiments of the invention, the transition state of a transaction may be tracked in existing centralized systems, such as entity system 101 and client system 102, to the transaction of the shared ledger 104, allowing a clear mapping of the provenance of all aspects of the transaction. That feature illustrates the coherency between the legacy or existing centralized systems, such as entity system 101 and client platform 102, and the shared ledger 104 and of the transaction set. In addition, it allows reporting on distributed transactions that are committed to the shared ledger 104 and tracking of ownership and provenance, such as the current ownership of assets as they exist in the shared ledger and in the existing centralized systems. Finally, it allows notification via a reporting mechanism to raise exceptions if there is an error in the coherency of a transaction. Thus, if there is a transaction anomaly, and variances exist in a part of the system, the reporting mechanism may generate an alert notification and inquiry to resolve such anomaly.

Further, the stateless application 108 for embodiments of the invention may implement a finite state machine that enforces state transitions of ISO XML V3 payments processing (Version 3 of the XML ISO standard for electronic data interchange between financial institutions payments) by moving transactions between a set of control entities, referred to as "client user", "issuer", "unprocessed", "pay out", and "retire". Thus, a finite state machine is implemented not only to track the movement of, but also to enforce the state transition of, payment processing.

In embodiments of the invention, this may be accomplished, for example, by moving a transaction between a set of control entities that may be likened to accounts, each of which maps directly to a processing state in the existing system. Such set of states may be increased to represent more complex finite state machines or reduced for simplification. The set of states may be used, for example, to represent the states of cashing in or issuing, cashing out or retiring, and interim movement between processing and awaiting processing. This enables automated processing and enforcement of state transition, and the movement of digital asset representation of digital assets may be enforced to move between a known deterministic set of transitions, thereby allowing straight through, automated processing. This also allows manual intervention in the event something goes wrong, allowing an operator to move the funds between these states with a clear audit trail.

Additionally, the stateless application 108 for embodiments of the invention may provide a set of generic operations for reading and writing of payments and FX message sets as a tamperproof sequence of data on the shared ledger 104. This set of operations is designed to be decoupled from any specific shared ledger platform so as to work with any shared ledger platform. Examples of such shared ledger platforms may include BITCOIN, ETHEREUM, and HYPERLEDGER. It is to be understood, however, that embodiments of the invention are not limited to employment of a shared ledger and further that, if a shared ledger is employed, embodiments of the invention are not limited to blockchain shared ledgers but may include any other type of shared ledger.

In embodiments of the invention, the set of generic operations may provide a number of functions, such as creation of an asset on the shared ledger 104 which may be necessary for any shift of an asset to the shared ledger. Other such functions may include, for example, listing assets that exist on the shared ledger 104, creating an account-like grouping of ownership of assets on the shared ledger, and creating a list of grouping of ownership entities on the shared ledger. Other such functions may include, for example, creating actions such as issuance of an asset, spending an asset and retirement of an asset, or building a transaction for submission to the shared ledger 104, submitting a signed transaction to the shared ledger that is signed to prove ownership of the transaction, listing any transactions on the shared ledger, and signing a built transaction on the shared ledger using a hardware security module in order to submit a signed transaction to the shared ledger.

Figure 2:
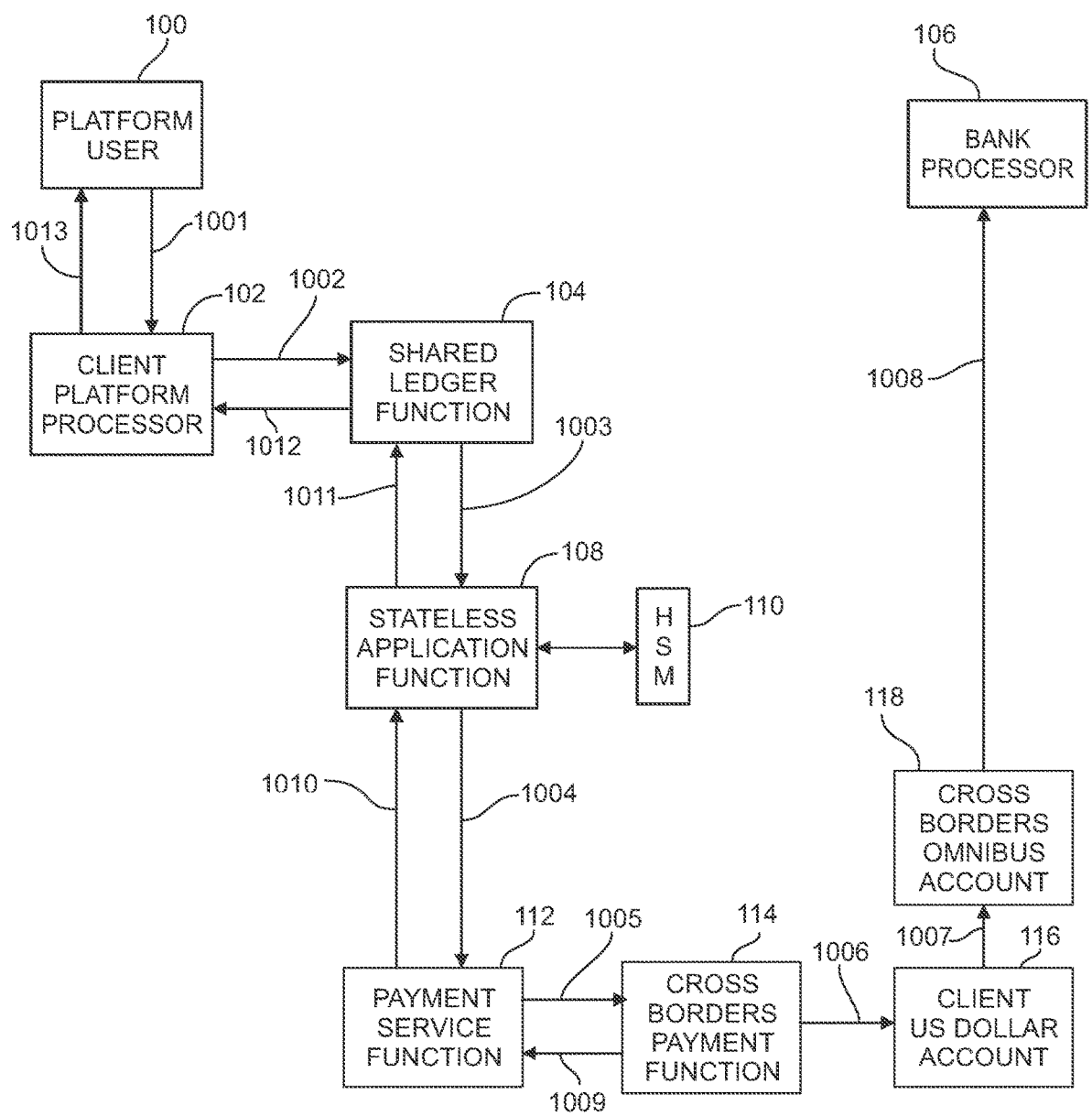
FIG. 2 is a schematic diagram that illustrates an overview example of components and flow of information between components in a cash-out process employing the stateless application for embodiments of the invention.

FIG. 2 is a schematic diagram that illustrates an overview example of components and flow of information between components in a cash-out process employing the stateless application for embodiments of the invention. Referring to FIG. 2, such components may include, for example, external systems or components such as at least one processor of a client platform 102 in communication with a shared ledger function 104 of the at the least one client processor, and a client platform user's banking processor 106; the stateless application 108 for embodiments of the invention executing on at least one entity processor and in communication with the shared ledger function 104; a payment service function 112 of the at least one entity processor in communication with the stateless application function 108, and a cross borders payment function 114 of the at least one entity processor in communication with the payment service function 112.

Referring further to FIG. 2, at 1001, the at least one client platform processor 102 may receive a client platform user's initiation of a cash-out transaction that includes beneficiary details, and at 1002, may commit the transaction initiation to the shared ledger function 104. At 1003, the stateless application function 108 may pull/extract the beneficiary and transaction information from the shared ledger function 104, parse the received transaction information, and at 1004-1005, send a payment file to the cross borders payment function 114 of the at least one entity processor via an entity payment service function 112 of the at least one entity processor.

Referring again to FIG. 2, at 1006, the cross borders payment function 114 of the at least one entity processor may cause funds for the transaction to be transferred from a client US dollar account 116 to a cross borders payment function omnibus account 118 at 1007 and a payment for the transaction to be sent at 1008 to the processor 106 of the bank of the platform user. Thereafter, at 1009, the cross borders payment function 114 of the at least one entity processor may return a payment status update to the payment service function 112 of the at least one entity processor, and at 1010, the entity payment service function 112 may send a payment status report to the stateless application function 108. At 1011, the stateless application function 108 may commit a transaction completion to the shared ledger 104. At 1012, the at least one client platform processor 102 may poll the shared ledger function 104 for the transaction, for example, with a reference identifier, and at 1013, the at least one client platform processor 102 may display a transaction completion message for the platform user 100.

Figure 3:
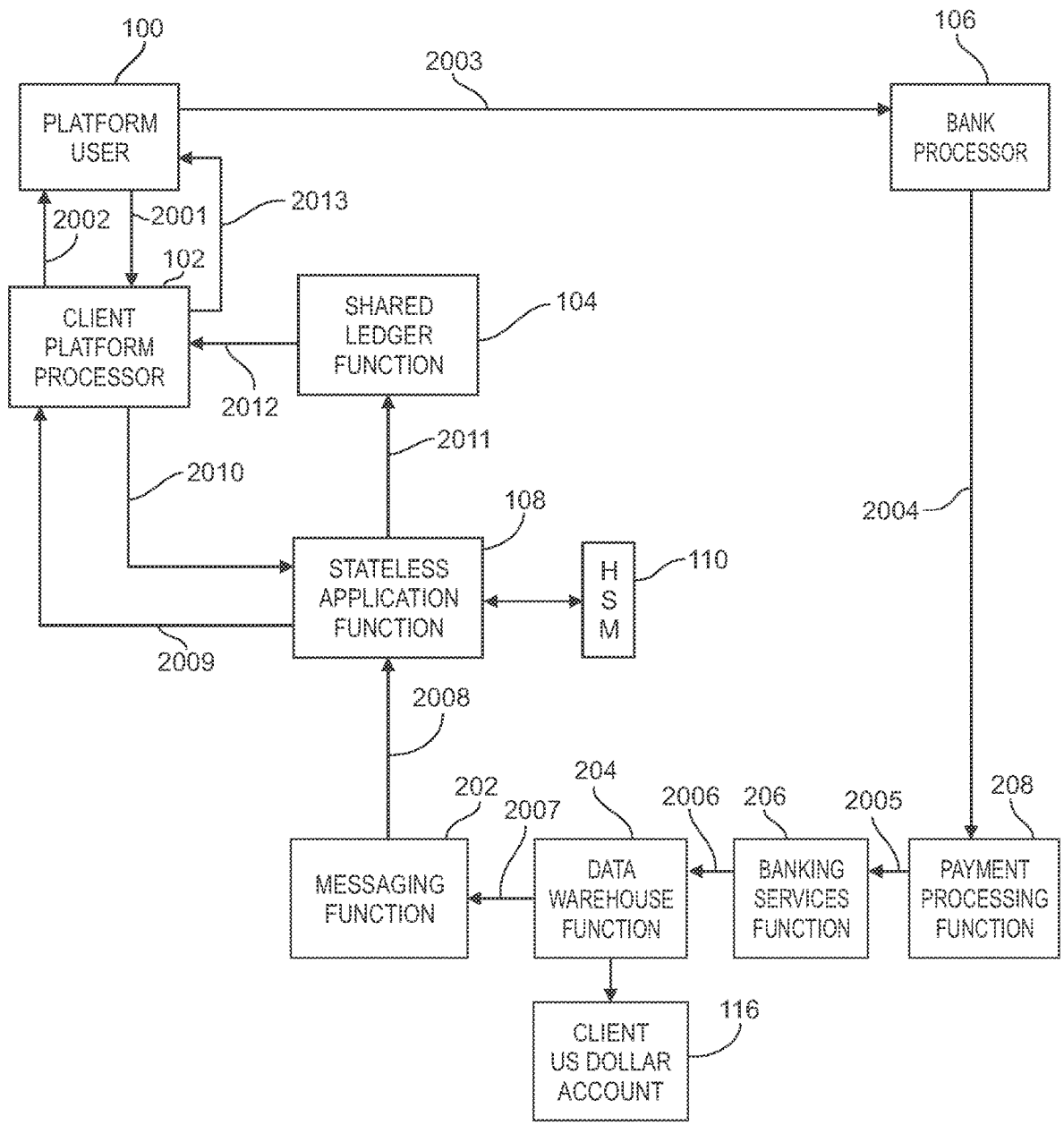
FIG. 3 is a schematic diagram that illustrates an overview example of components and flow of information between components in a cash-in process employing the stateless application for embodiments of the invention.

FIG. 3 is a schematic diagram that illustrates an overview example of components and flow of information between components in a cash-in process employing the stateless application for embodiments of the invention. Referring to FIG. 3, such components may include, for example, external components such as the at least one client platform processor 102 in communication with the shared ledger function 104 of the at least one client processor, and the processor 106 of the bank of the client platform user; the stateless application 108 for embodiments of the invention executing on the at least one entity processor and in communication with the shared ledger function 104; a messaging function 202 of the at least one entity processor in communication with the stateless application function 108 and a global data warehouse function 204 of the entity processor, and banking services 206 and payment processing 208 functions of the at least one entity processor.

Referring further to FIG. 3, at 2001, the at least one client platform processor 102 may receive a client platform user's cash-in transaction request and an amount of the request and, at 2002, may send collection account details and a transaction reference to the client user 100. At 2003, the client user 100 may send an instruction to the processor 106 of the user's bank to make a transaction and, at 2004, the processor 106 of the user's bank may send, for example, a US dollar payment instruction via wire to the payment processing function 208 of the one or more entity processors. At 2005, the payment processing function 208 may send the payment to the banking services function 206, and at 2006, the banking services function 206 may update the account and send a confirmation of credit to the global data warehouse function 204 for the client US dollar account 116.

Referring again to FIG. 3, at 2007, the global data warehouse function 204 may send, for example, a SWIFT MT942 intraday statement message to the messaging function 202. At 2008, the stateless application function 108 may pull the SWIFT MT942 intraday statement message from the messaging function 202, and at 2009, may send a payment reference identifier to the at least one client platform processor 102. At 2010, the at least one client platform processor 102 may confirm a match and provide a shared ledger address, a US dollar amount and a reference identifier to the stateless application function 108, and at 2011, the stateless application function 108 may write the transaction with the reference identifier to the shared ledger function 104. It is to be understood that the transaction with the reference identifier that is submitted to the shared ledger 104 may be first signed by the HSM 110 to produce a digitally signed transaction. At 2012, the at least one client platform processor 102 may poll the shared ledger 104 for the transaction with the reference identifier, and at 2013, the at least one client platform processor 102 may send a notification of the completed transaction to the client user 100.

Figure 4:
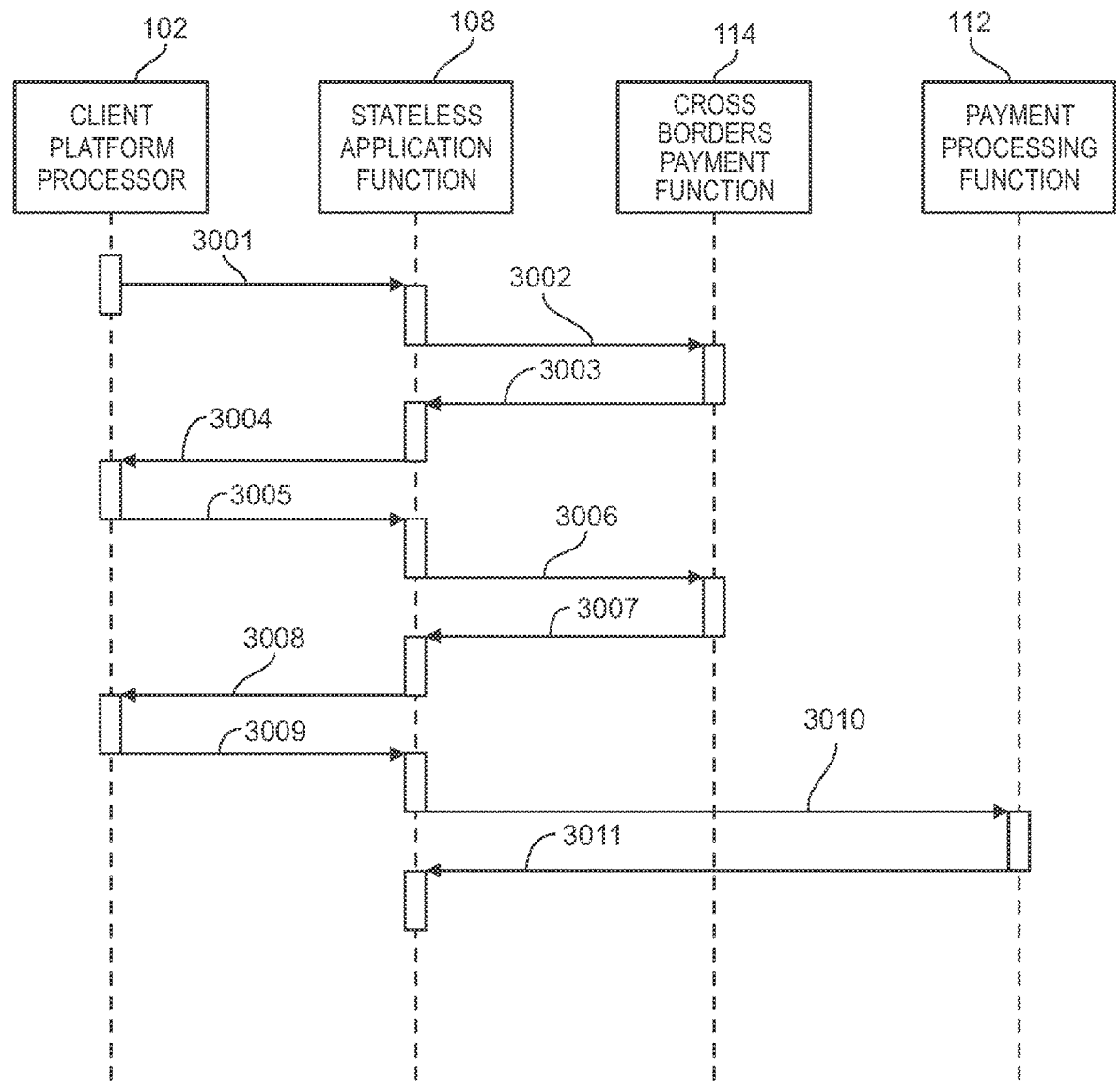
FIG. 4 is a sequence diagram that illustrates an overview example of components and flow of information between components in a cash-in and subsequent cash-out process employing the stateless application for embodiments of the invention.

FIG. 4 is a sequence diagram that illustrates an overview example of components and flow of information between components in a cash-in and subsequent cash-out process employing the stateless application for embodiments of the invention. Assume, for example, a client in Brazil cashing into the system for embodiments of the invention, such as exchanging Brazil reals for EC dollars, and later cashing out those EC dollars into US dollars from the cash-out book. In such example, the "cash-in" flow may involve acquiring EC dollars, and the "cash out" flow may involve cashing out the EC dollars into US dollars.

Referring to FIG. 4, at 3001, the at least one client platform processor 102 may receive a client request to exchange, for example, Brazil reals for an amount of EC dollars and may generate an FX rate request to the stateless application 108 executing on the at least one entity processor. At 3002, the stateless application 108 may parse the received rate request and generate and push a message queue rate request, for example, to the cross borders payments function 114 of the at least one entity processor, and at 3003, the cross borders payments function 114 may generate and push an FX rate response via message queue to the stateless application 108 executing on the at least one entity processor. Thereafter, at 3004, the stateless application 108 may translate the message queue FX rate response to a format of the client platform and send the translated FX rate response to the client platform processor 102.

Referring again to FIG. 4, at 3005, the client platform processor 102 may receive and parse the translated FX rate response, present an FX offer to the client, receive the client's FX deal book request, and send the FX deal book request to the stateless application 108 executing on the at least one entity processor. At 3006, the stateless application 108 executing on the at least one entity processor may translate the client FX deal book request to a message queue FX deal book request and send it to the cross borders payments function 114 via message queue. At 3007, the cross borders payments function 114 may generate, parse, and send an FX deal book response to the stateless application 108 executing on the at least one entity processor.

Referring further to FIG. 4, at 3008, the stateless application 108 executing on the at least one entity processor may translate the message queue FX deal book response, that may include instructions on how to transfer the Brazil reals into a specific account with a specific reference, to the format of the client platform and send the translated instructions to the client platform processor 102. In addition, the stateless application 108 may also generate and push a pre-advice file to a reconciliation function of the at least one entity processor, which may hold the pre-advice file for matching after a deposit to the specific account. Based on the instructions, an amount of build currency may be wired for the client to the specific account with the specific reference, and the arrival of the wired currency may trigger a funding message which may be matched with the pre-advice and reported to the client for an approval. Upon receipt of the client's approval, a set of transactions may be processed, resulting in an issuing transaction to an address on a shared ledger.

At this point, an amount of an asset has been issued and transmitted and the ownership of that asset transferred to the client. For example, the client is the owner of $1000 EC dollars that were purchased at a cost, such as 2000 Brazil reals, so the client has that amount of EC dollars in the client's existing banking system, and there is an account with a credit of that amount that exists on the shared ledger that represents that asset. The transaction may be correlated to the funding account to the issuance on the shared ledger. As recipient of the EC dollars, the client may wish to do something, such as spend the EC dollars to buy securities or for some other purpose. For example, when the client receives the EC dollars and wishes to cash out and receive USD dollars in the client's account, the client may initiate a "cash out" flow.

Thus, referring once again to FIG. 4, at 3009, the client platform processor 102 may create a transaction and within that transaction may place metadata which contains the mandatory, optional, and conditional fields. Assume, for example, that the client is in the US. Therefore, the interchange data may include, for example, a set of mandatory fields across all countries, a conditional field for the US, and an optional field to correlate the particular transaction on the shared ledger 104, such as EC dollars, to the backend systems. Also at 3009, the client platform processor 102 may submit the transaction to the stateless application 108 executing on the at least one entity server processor, which may be sent to an unprocessed account as an initial step in the state transition system. At 3010, the stateless application 108 may read the dollars from the returning transactions periodically from the particular grouping and validate the information, and if valid, the stateless application 108 may instruct, for example, an ISO XML payment of the US dollars to the client who made the request.

Referring once more to FIG. 4, assume, for example, that the client wishes to cash out the entire amount, such as $1000 US dollars, so there is no FX component. Thus, at 3010, the stateless application 108 executing on the entity server processor may construct an ISO XML payment message and reliably transmit the message upstream to the payments service function 112 processor, for example, via other financial systems. At 3011, the payment may be validated, the account may be credited, and a response may be provided to the stateless application 108 asynchronously. Thus, the stateless application 108 may not wait to receive the response but may receive it as it happens. The stateless application 108 is decoupled from the transport and can look up an object and determine exactly to what it corresponds in its set system and create a transaction to retire the $1000 US dollars, effectively creating a transaction to retire and remove the funds. All information relating to funds is in the reference data, so that the transaction history may be audited and the ownership and other details may be seen. At this point there are no US dollars posted.

Figure 5:
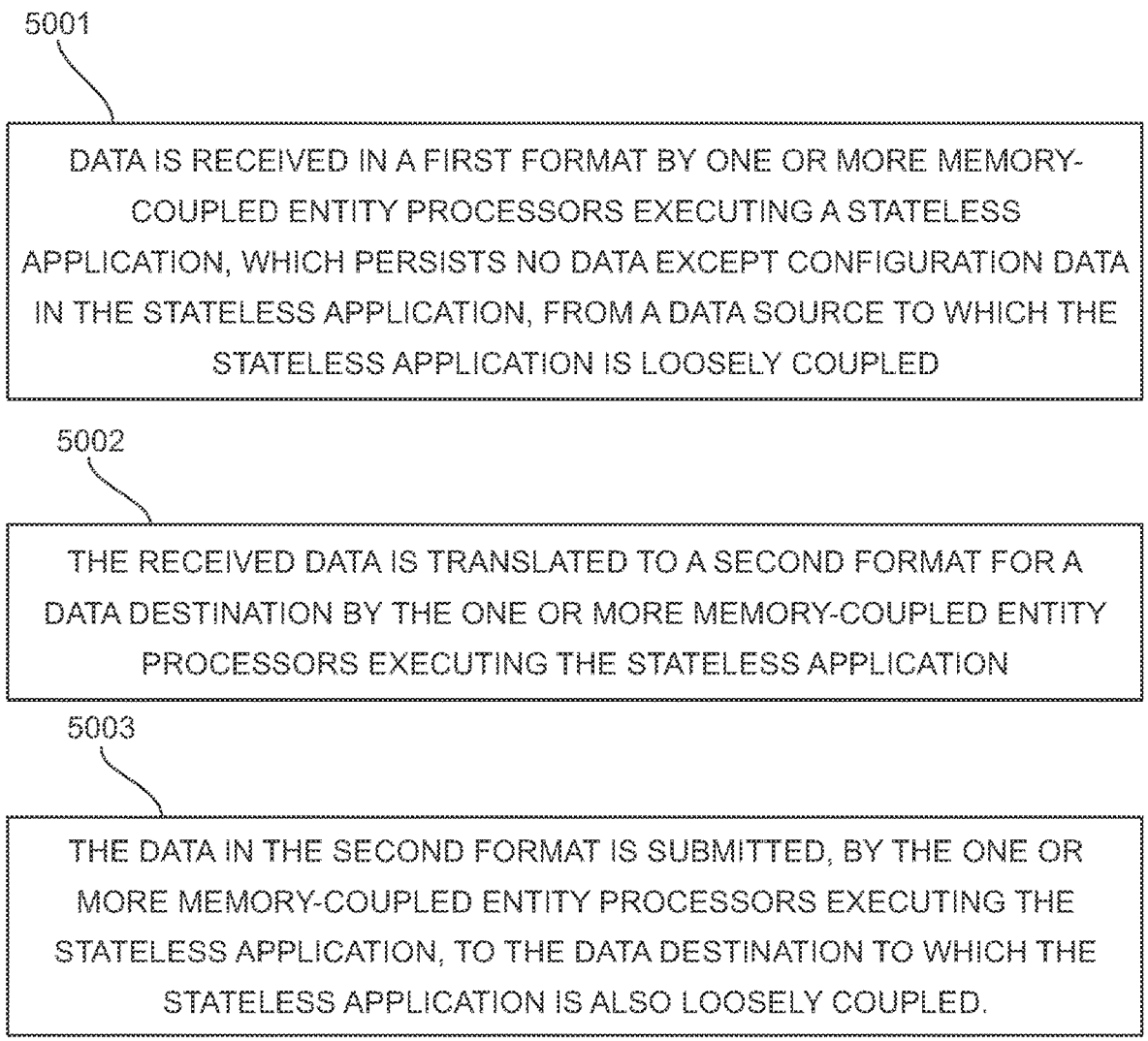
FIG. 5 is a flow chart that illustrates an example of the process of communicating data in a stateless environment for embodiments of the invention.

FIG. 5 is a flow chart that illustrates an example of the process of communicating data in a stateless environment for embodiments of the invention. Referring to FIG. 5, at 5001, data may be received in a first format by one or more memory-coupled entity processors executing a stateless application that persists no data except configuration data in the stateless application data from a data source to which the stateless application executing on one or more one entity processors is loosely coupled. At 5002, the received data may be translated to a second format for a data destination by the one or more memory-coupled entity processors executing the stateless application. At 5003, the data in the second format may be submitted, by the one or more memory-coupled entity processor executing the stateless application, to the data destination to which the stateless application executing on the at least one entity processor is also loosely coupled.

It is to be understood that embodiments of the invention may be implemented as processes of a computer program product, each process of which is operable on one or more processors either alone on a single physical platform, such as a personal computer, or across a plurality of platforms, such as a system or network, including networks such as the Internet, an intranet, a WAN, a LAN, a cellular network, or any other suitable network. Embodiments of the invention may employ client devices that may each comprise a computer-readable medium, including but not limited to, random access memory (RAM) coupled to a processor. The processor may execute computer-executable program instructions stored in memory. Such processors may include, but are not limited to, a microprocessor, an application specific integrated circuit (ASIC), and or state machines. Such processors may comprise, or may be in communication with, media, such as computer-readable media, which stores instructions that, when executed by the processor, cause the processor to perform one or more of the steps described herein.

It is also to be understood that such computer-readable media may include, but are not limited to, electronic, optical, magnetic, RFID, or other storage or transmission device capable of providing a processor with computer-readable instructions. Other examples of suitable media include, but are not limited to, CD-ROM, DVD, magnetic disk, memory chip, ROM, RAM, ASIC, a configured processor, optical media, magnetic media, or any other suitable medium from which a computer processor can read instructions. Embodiments of the invention may employ other forms of such computer-readable media to transmit or carry instructions to a computer, including a router, private or public network, or other transmission device or channel, both wired or wireless. Such instructions may comprise code from any suitable computer programming language including, without limitation, C, C++, C#, Visual Basic, Java, Python, Perl, and JavaScript.

It is to be further understood that client devices that may be employed by embodiments of the invention may also comprise a number of external or internal devices, such as a mouse, a CD-ROM, DVD, keyboard, display, or other input or output devices. In general such client devices may be any suitable type of processor-based platform that is connected to a network and that interacts with one or more application programs and may operate on any suitable operating system. Server devices may also be coupled to the network and, similarly to client devices, such server devices may comprise a processor coupled to a computer-readable medium, such as a random access memory (RAM). Such server devices, which may be a single computer system, may also be implemented as a network of computer processors. Examples of such server devices are servers, mainframe computers, networked computers, a processor-based device, and similar types of systems and devices.

What is claimed is:

1. A system, comprising:
one or more memory-coupled processors programmed to execute a stateless application that persists no data except configuration data in the stateless application itself, the stateless application causing the one or more memory-coupled processors to:
store an instance of data received from a second processor within an interchange construct that is independent of a first format in which the instance of the data was received;
discard the instance of the data in the first format as the instance of the data is read without discarding the configuration data of the stateless application; and
write the instance of the data in a second format that is different from the first format to a data destination associated with a third processor without persisting any of the instance of the data received, stored, or written in the stateless application except for the configuration data.

2. The system of claim 1, wherein the first format comprises a predetermined electronic data interchange format.

3. The system of claim 2, wherein the interchange construct is independent of the predetermined electronic data interchange format and is based at least in part on a predefined set of parameters received in metadata associated with the instance of the data.

4. The system of claim 1, wherein the second processor is separate from the one or more memory-coupled processors and is coupled to the stateless application executing on the one or more memory-coupled processors.

5. The system of claim 1, further comprising application code instructions to translate, when stored, the stored instance of the data to the second format.

6. The system of claim 5, wherein the second format comprises a predefined tamper-proof sequence of data for another data destination comprising a shared ledger function operating on a fourth processor that is separate from the one or more memory-coupled processors and is coupled to the stateless application executing on the one or more memory-coupled processors and is coupled to at least one client memory-coupled processor associated with a client.

7. The system of claim 1, wherein the data destination comprises a shared ledger function operating on the third processor that is separate from the one or more memory-coupled processors is coupled to the stateless application executing on the one or more memory-coupled processors and is coupled to at least one client memory-coupled processor.

8. The system of claim 1, wherein the one or more memory-coupled processors of a first user of a consortium of users share a distributed private blockchain ledger with one or more processors of each of a plurality of other users of the consortium of the users.

9. A method to execute a stateless application that persists no data except configuration data in the stateless application itself, comprising:
storing, by one or more computing devices, an instance of data received from a second processor within an interchange construct that is independent of a first format in which the instance of the data was received;
discarding, by the one or more computing devices, the instance of the data in the first format as the instance of the data is read without discarding the configuration data of the stateless application; and
writing, by the one or more computing devices, the instance of the data in a second format that is different from the first format to a data destination operating on a third processor without persisting any of the instance of the data received, stored, or written in the stateless application except for the configuration data.

10. The method of claim 9, wherein the first format comprises a predetermined electronic data interchange format.

11. The method of claim 10, wherein the interchange construct is independent of the predetermined electronic data interchange format and is based at least in part on a predefined set of parameters received in metadata associated with the instance of the data.

12. The method of claim 9, wherein the second processor is separate from the one or more computing devices and is coupled to the stateless application executing on the one or more computing devices.

13. The method of claim 9, further comprising translating the instance of the data to the second format.

14. The method of claim 9, wherein the second format comprises a predefined tamper-proof sequence of data for another data destination comprising a shared ledger function operating on a fourth processor that is separate from the one or more computing devices and is coupled to the stateless application executing on the one or more computing devices and is coupled to at least one client memory-coupled processor associated with a client.

15. The method of claim 9, wherein the data destination comprises a shared ledger function operating on the third processor that is separate from the one or more computing devices and is coupled to the stateless application executing on the one or more computing devices and is coupled to at least one client memory-coupled processor.

16. The method of claim 9, wherein the one or more computing devices of a first user of a consortium of users with one or more processors of each of a plurality of other users of the consortium of the users.

17. A computer program product, comprising:
a non-transitory computer-readable medium having computer-readable program instructions embodied thereon, the computer-readable program instructions comprising instructions to:
store an instance of data received from a second processor within an interchange construct that is independent of a first format in which the instance of the data was received;
discard the instance of the data in the first format as the instance of the data is read without discarding configuration data of a stateless application; and
write the instance of the data in a second format that is different from the first format to a data destination operating on a third processor without persisting any of the instance of the data received, stored, or written in the stateless application except for the configuration data.

18. The computer program product of claim 17, wherein the first format comprises a predetermined electronic data interchange format.

19. The computer program product of claim 18, wherein the interchange construct is independent of the predetermined electronic data interchange format and is based at least in part on a predefined set of parameters received in metadata associated with the instance of the data.

20. The computer program product of claim 19, wherein the computer-readable program instructions are executed by at least one memory-coupled entity processor, and wherein the second processor is separate from the at least one memory-coupled entity processor and is coupled to the stateless application executing on the at least one memory-coupled entity processor.

* * * * *